United States Patent [19]

Gale

[11] Patent Number: 5,176,348
[45] Date of Patent: Jan. 5, 1993

[54] INTERLOCKING SHELF BRACKET

[76] Inventor: John A. Gale, 3959 Colorado Ave. South, St. Louis Park, Minn. 55416

[21] Appl. No.: 828,419

[22] Filed: Jan. 31, 1992

[51] Int. Cl.⁵ .............................................. A47B 96/06
[52] U.S. Cl. .................................... 248/220.2; 52/657
[58] Field of Search ............... 248/220.2, 220.1, 205.1, 248/200, 235, 250; 403/174, 178, 175, 205, 403, 191; 52/657

[56] References Cited

U.S. PATENT DOCUMENTS

| | | | |
|---|---|---|---|
| 1,263,249 | 4/1918 | Hoppes | 403/174 |
| 1,672,502 | 6/1928 | Roth. | |
| 1,915,215 | 6/1933 | Carpenter | 403/403 X |
| 3,386,590 | 6/1968 | Gretz. | |
| 3,836,009 | 9/1974 | Horowitz et al. | |
| 3,944,377 | 5/1976 | Defrese. | |
| 4,236,642 | 12/1980 | Klein | 403/175 X |
| 4,299,509 | 11/1981 | Meickl | 403/174 X |
| 4,322,051 | 3/1982 | Shepard. | |
| 4,385,850 | 5/1983 | Bobath. | |
| 4,421,423 | 12/1983 | Lederrey. | |
| 4,709,892 | 12/1987 | Gurgui. | |
| 4,805,860 | 2/1989 | Holstrom. | |
| 4,812,075 | 3/1989 | Lavin, Sr. | 403/205 X |

Primary Examiner—Ramon O. Ramirez
Attorney, Agent, or Firm—Haugen and Nikolai

[57] ABSTRACT

An interlocking shelf bracket of simple and durable design which is arranged to be utilized with lumber and/or shelving with two or more standard thickness dimensions. The shelf bracket comprises a generally "L"-shaped connection member with an angular body and with triangular-shaped interlocking projections which engage corresponding openings of a neighboring member of like configuration. The shelf bracket of the present invention is designed to be used with conventional fasteners including screws and nails.

5 Claims, 3 Drawing Sheets

INTERLOCKING SHELF BRACKET

BACKGROUND OF THE INVENTION

The present invention relates generally to an improved interlocking shelf bracket, and more particularly to such a bracket device which is of simple and durable design, readily installed in place, and efficiently utilized with lumber and/or shelving with two or more standard thickness dimensions. The improved interlocking shelf bracket of the present invention is designed so as to distribute load stresses established during normal use and thus create a highly effective device to form an array of individual shelving members arranged in a wide variety of preselected dispositions.

In the past, a substantial number of shelf bracket devices have been proposed and developed and which provide a means for attaching two or more structural members (normally standard lumber) together to form a desired shelving arrangement. While these devices have been generally useful and accepted, their use was frequently limited to lumber of one standard dimension, and furthermore may have been ineffective for distributing stresses created by loading. Also, certain prior designs have been complex, cumbersome, and hence did not lend themselves to simple or readily facilitated installation. The improved shelf bracket of the present invention is designed to be used with like brackets of identical configuration and employs conventional fasteners, including screws and nails. Thus the present invention is adapted for use by a wide variety of consumers.

SUMMARY OF THE INVENTION

The improved shelf bracket of the present invention comprises a generally "L"-shaped connection member consisting of an angle body and arranged for interlocking mating relationship with a like connection member. Thus, the devices may be mounted in place in an assembly which includes interconnections in either a criss-cross pattern or in a "T", inverted "T", or "L" configuration. The individual connection members comprise a planar face with a substantially continuous flanged surface extending from the inner edge to form the angle body member. The "L"-shaped member includes a common apex with first and second legs extending at right angles from the apex.

In order to provide for the interlocking mating relationship, a generally rectangularly shaped opening is formed on the planar face and extends inwardly from the outer edge surface of the planar face. The rectangularly shaped opening, therefore, has an inner side surface with opposed end surfaces defining the opening, and with a plurality of teeth defining serrations formed along the opposed end surfaces. A similarly and mating shaped interlocking projection is formed on the planar surface of the other leg and the projection is arranged to be received within the opening formed in the other leg. While the projections and openings of an individual bracket member are not engaged together, one with another, the mating components and pieces are present upon and received from a separate member mounted in place to make and/or complete the shelving assembly desired. In order to provide additional stability, two generally equilateral triangular projections are formed in the device, one being located at and adjacent the apex zone, with one edge surface of a leg of the equilateral triangular projection lying along and coincidental with the projection of a plane bisecting the apex. The other is located in the inner side surface of the rectangularly shaped opening, and a mating projection is provided on the interlocking projection identified above.

With this arrangement, a single piece of a material of construction may be provided, preferably of plastic construction, but a metallic member could be effectively utilized as well. The members are identical and thus interchangeable, and are designed to work with lumber having different standard dimensions, such as two different standard dimensions of, for example, ½-inch and ⅝-inch. The arrangement of the teeth forming the serrations assists in stress distribution incurred upon loading, thus rendering the apparatus more effective for utilization in book shelves, or other arrangements where loads may become substantial. The apparatus utilizes conventional fasteners, such as nails or screws, and thus is easily installed and easily changed should it become desirable to change, modify, or otherwise alter a pre-established shelving arrangement.

Therefore, it is a primary object of the present invention to provide an improved interlocking shelf bracket means for joining individual structural members together in right angular relationship one to another, to form an array of individual shelving members in a preselected and desired disposition.

It is a further object of the present invention to provide an improved interlocking shelf bracket means which is conveniently fabricated from a molded plastic part, with metallic components being acceptable as well, and with the shelf bracket means including a single interchangeable member adapted for use in connection with lumber of either two or more different standard dimensions.

It is yet a further object of the present invention to provide an improved interlocking shelf bracket means which is designed to provide for a moderate distribution of load-induced stresses, thereby improving the quality and stability of the assembly when in place.

It is still a further object of the present invention to provide an improved interlocking shelf bracket means for use in creating arrays of shelving, which is designed to utilize conventional fasteners, and which is easily and expeditiously installed.

Other and further objects of the present invention will become apparent to those skilled in the art upon study of the following a specification, appended claims, and accompanying drawings.

IN THE DRAWINGS

DESCRIPTION OF THE PREFERRED EMBODIMENT

Figure 1:
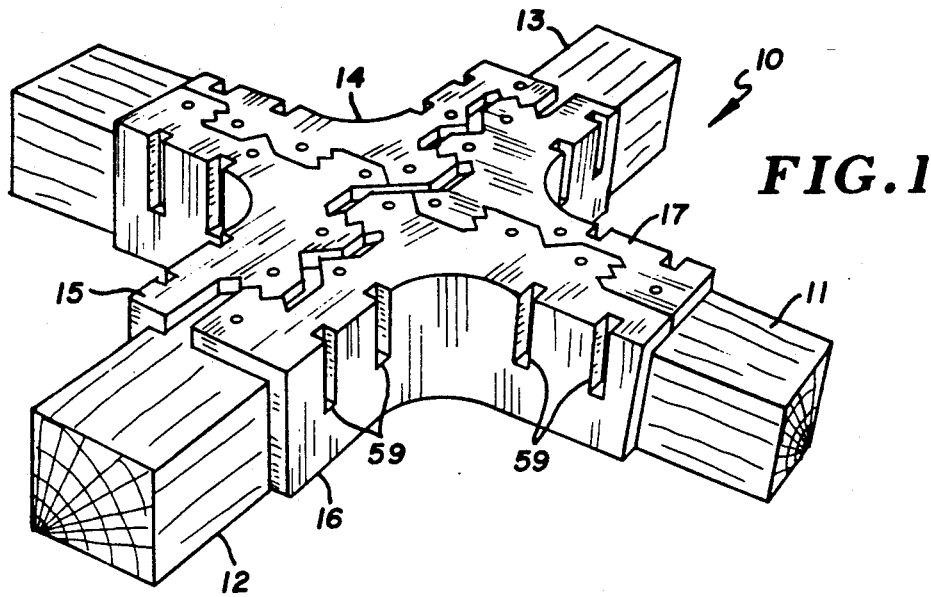
FIG. 1 is a perspective view of a segment of support members for a shelving or similar arrangement, and utilizing an assembly comprising three individual pieces of lumber in a cross-connection fashion, and with the arrangement, as illustrated, being utilized in combination with lumber of two different standard dimensions.
Figure 2:
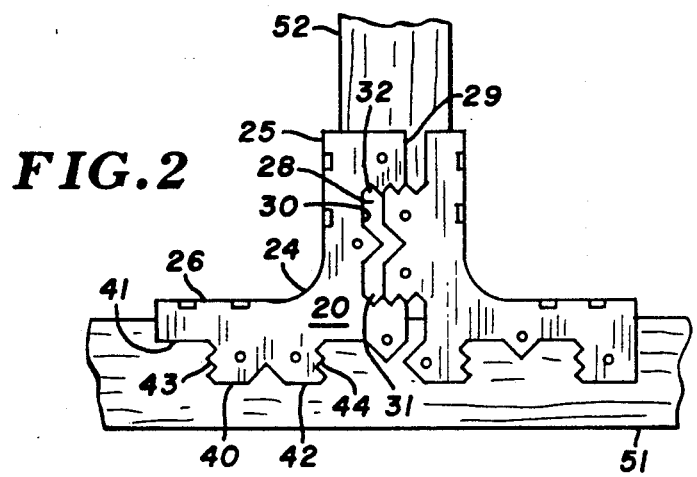
FIG. 2 is a front elevational view of a modified assembly arrangement of lumber employing the interlocking shelf bracket means of the present invention in an inverted "T" disposition.

In accordance with the preferred embodiment of the present invention, and with particular attention being directed to FIG. 1 of the drawings, the interlocking shelf bracket means and assembly generally designated 10 includes a dimensioned wooden cross-member 11 together with upright segments 12 and 13 secured thereto. It will be noted that the cross-member 11 is of a cross-sectional dimension which is less than that of the members 12 and 13. In order to create and complete the assembly, the arrangement includes four individual interlocking shelf bracket members 14, 15, 16 and 17, each of which is secured to two individual members of the lumber segments 11, 12, and 13, and which are arranged in appropriate interlocking relationship, one to another. In this connection, each of the members 14-17 is designed for mating engagement with its neighbors, such as, for example, with member 14 being engaged with members 15 and 17, as illustrated.

Because of the size differences, the engagement of connection member 14 with its two neighbors is distinct and different. In this arrangement, structural member 13 has a cross-sectional dimension which is greater than that of member 11 and thus the inter-engagement is distinct and different, as will be set forth more fully hereinafter.

Figure 5:
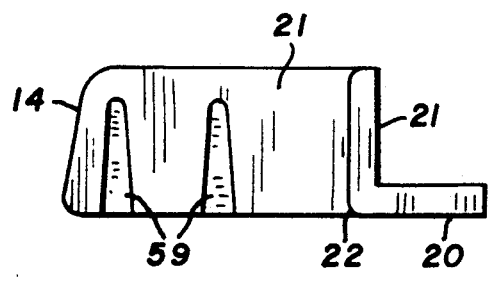
FIG. 5 is a top plan view of the shelf bracket means illustrated in FIGS. 1-4 herein.
Figure 7:
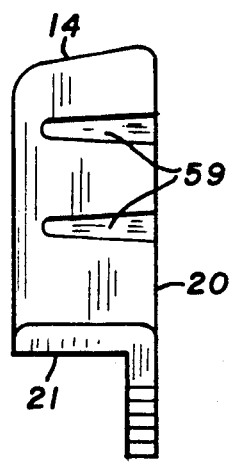
FIGS. 6, 7 and 8 are front elevational, left end elevational, and right end elevational views respectively of the device illustrated in FIGS. 1-5 herein.
Figure 6:
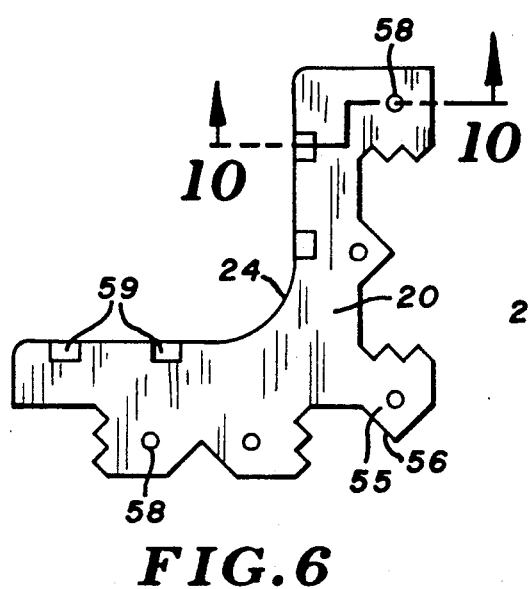
Figure 8:
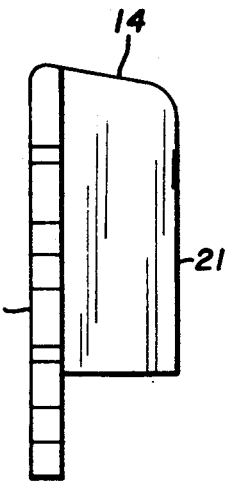
Figure 9:
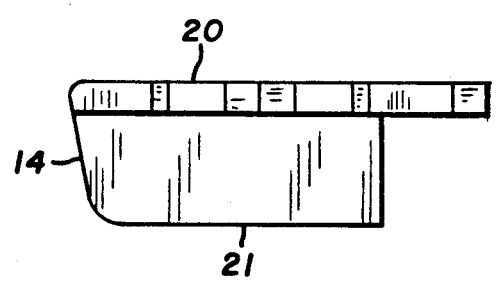
FIG. 9 is a bottom plan view of the shelf bracket.

With continued attention being directed to FIGS. 1-5 of the drawings, the "L"-shaped connection member of the type illustrated at 14-17 inclusive, consists of an angle body, such as can be seen in FIGS. 5 and 6, with the angle body including a planar face 20 together with a substantially continuous flanged surface 21 extending therefrom. The flanged surface extends from the inner edge 22 so as to form the angle body as illustrated. As is apparent in the views of FIGS. 1-5, and particularly those of FIGS. 2, 3 and 4, the connection member further comprises an apex zone as at 24 from which a first leg 25 and a second leg 26 extend. Legs 25 and 26 are, as indicated, at right angles, one to another.

Figure 3:
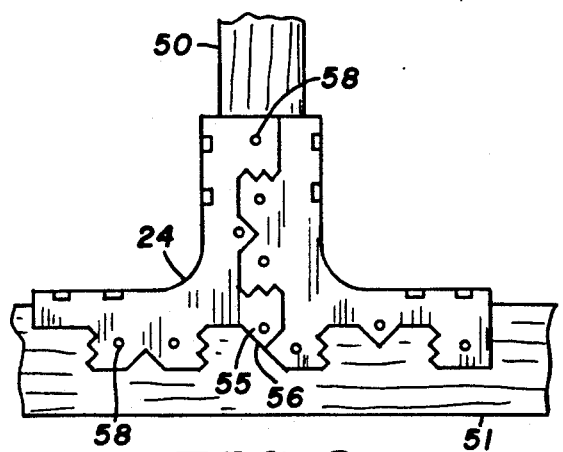
FIG. 3 is a view similar to FIG. 2 and illustrating the arrangement utilizing a narrower dimension than that utilized in the structure of FIG. 2.
Figure 4:
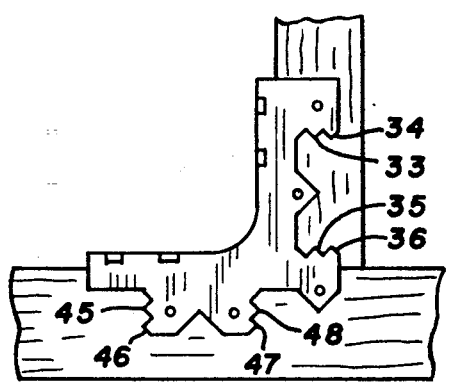
FIG. 4 is a view illustrating the use of a single shelf bracket means to join together two pieces of lumber in an inverted "T" disposition.

A generally rectangularly shaped opening is formed on the planar face, with this opening being shown as at 28. This opening extends inwardly from the outer edge surface 29 of the planar face of the first leg 25, with the opening 28 having an inside surface as at 30 with opposed end surfaces 31 and 32 also serving to define the rectangularly shaped opening 28. A plurality of teeth are shown as at 33, 34, 35 and 36, with these teeth defining serrations formed along the opposed end surfaces 31 and 32. A generally rectangularly shaped interlocking projection is provided a at 40 for mating engagement within the rectangularly shaped opening 28. This projection extends outwardly from the outer edge portion of planar face 20 as at 41, with projection 40 having an outer surface as at 42 with opposed end surfaces as at 43 and 44 completing the definition of the rectangular projection 40. A plurality of teeth as shown at 45, 46, 47 and 48 are provided for mating engagement with teeth 33-36 inclusive. These teeth 45-48 inclusive also form serrations, as indicated. The extent of mating engagements of teeth 33-36 with teeth 45-48 will depend upon the cross-sectional thickness of the lumber involved. In the configuration of FIG. 3, conventional lumber or shelving having a thickness of, for example, one-half inch is utilized, with the individual lumber segments being illustrated at 50 and 51. Cross-sectional thickness of lumber piece 51 is greater than that of lumber piece 50, and thus the inner engagement of the individual teeth is more limited. Attention is also re-directed to FIG. 2 wherein lumber piece 52 is shown in combination with the shelf brackets and lumber segment 51.

In order to further enhance the stability of the system, a generally equilateral triangular projection as at 55 (FIG. 3) is provided adjacent the apex. This triangular projection 55 extends from the planar face 20 of the first leg, and lies in generally opposed relationship to the apex. One lateral edge surface 56 of a leg of the equilateral triangular projection 55 lies in opposed relationship to apex 24 with edge surface 56 lying along the projection of a plane bisecting the apex 24.

Figure 10:
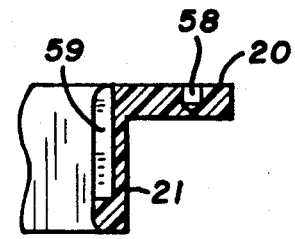
FIG. 10 is a horizontal sectional view taken along the line and in the direction of the arrows 10—10 of FIG. 6.
Figure 11:
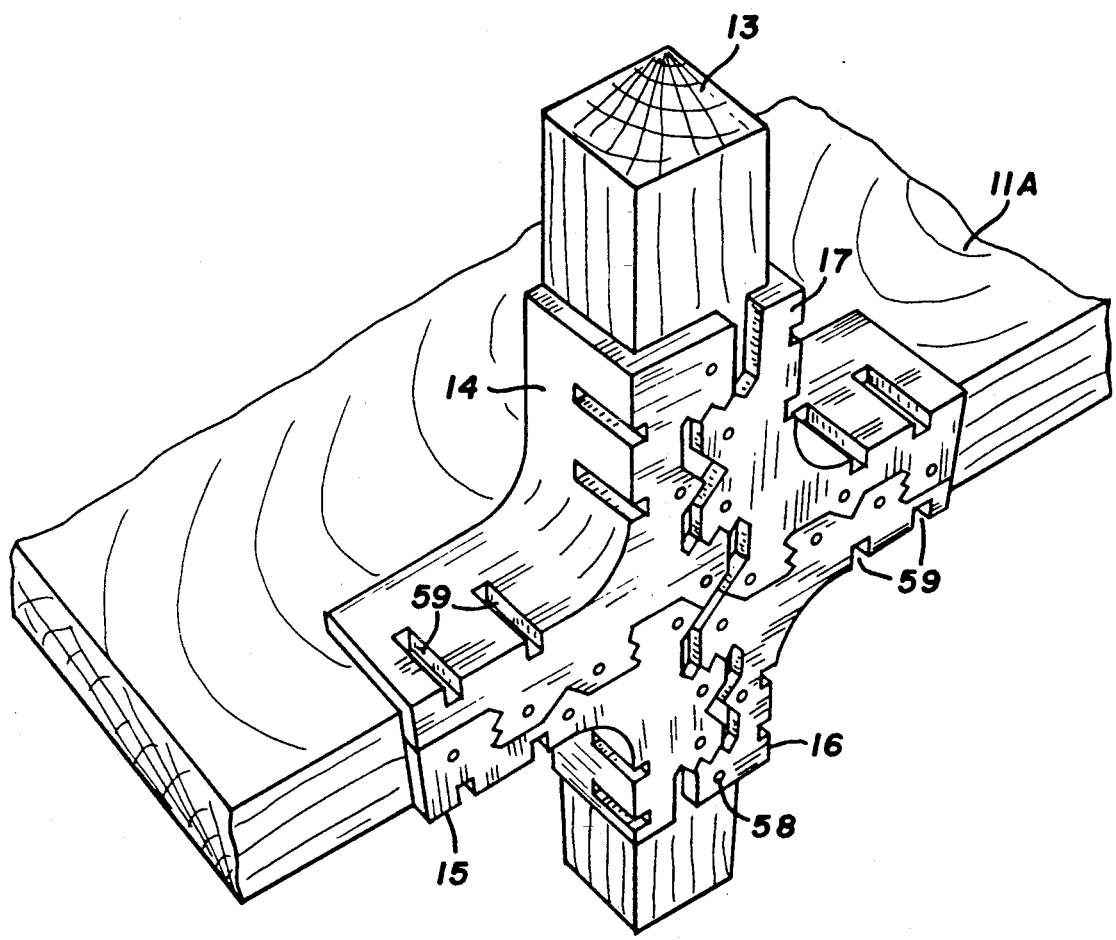
FIG. 11 is a perspective view similar to Figure and illustrating the shelf bracket means being utilized in combination with conventional dimensioned shelving material.

Means are provided along the planar face 20 as well as along the flanged surface 21 to receive and accommodate fasteners for attaching the shelf bracket means to the shelving or other support members. These fastener receiving means are in the form of bores as at 58-58, or furthermore may be in the form of tapered slots as at 59-59. Tapered slots 59-59 are, as indicated, disposed in the flanged portion 21. With attention being directed to FIG. 10 of the drawings, it will be observed that the individual bores 58-58 and tapered slots 59-59 do not extend entirely through the wall thickness of the device, thereby contributing further to the stability and strength of the bracket means of the present invention.

The overall arrangement of the device is such that the teeth mesh and interlock to form a stable interconnection, and with the interconnection between the shelf bracket and the lumber supports and/or shelving. The spacing of the teeth forming the serrations is such that the inner and outer side surfaces of the rectangularly shaped opening and projection respectively are in mutually abutting and engaged relationship with each other whenever structural members of either of two (or possibly more than two) commercially common thickness dimension lumber is being employed. The teeth, as well as the projection and rectangular opening are spaced apart by a distance equal to the center-to-center spacing of the teeth when a second individual structural or lumber member of the next larger commercially common thickness dimension is being utilized. In certain instances, it may be desirable to increase the size of the rectangular opening and projection in the event more than two sizes of lumber are intended to be accommodated, however for most purposes, the accommodation of two different sizes is deemed adequate.

The interlocking shelf bracket means of the present invention may be fabricated from a variety of materials, including molded plastic such as nylon, polyester, epoxy, or the like. Generally, it is preferred that the material be both tough and durable, and capable of being molded.

It will be appreciated that the specific examples given herein are provided for purposes of illustration only and not to be deemed as limitations upon the scope of the invention herein.

What is claimed is:

1. Interlocking shelf bracket means for joining individual structure members together in right angular relationship, one to another to form an array of individual members arranged in preselected disposition and comprising:

(a) a generally "L"-shaped connection member consisting of an angle body and arranged for interlocking mating relationship with a like connection member and including first and second legs, each leg comprising a planar face having an inner edge surface and outer edge surface and a substantially continuous flanged surface extending from the inner edge surface thereof to form said angle body member and including a common apex formed at the juncture of said first and second legs and with said first and second legs extending at right angles from said common apex;

(b) a generally rectangularly shaped opening formed on said planar face and extending inwardly from the said outer edge surface of said planar face of said first leg and having an inside opening-defining surface with opposed end surfaces defining said rectangularly shaped opening and with a plurality of teeth defining serrations being formed along said opposed end surfaces;

(c) a generally rectangularly shaped interlocking projection for mating engagement within said rectangularly shaped opening and extending outwardly from the said outer edge of said planar face of said second leg and having an outside protection-defining surface with opposed end surfaces defining said rectangular shaped projection with a plurality of teeth defining serrations being formed along said opposed ends surfaces and adapted to mate with and engage the serrations of said rectangular shaped opening;

(d) a generally equilateral triangular projection extending from the planar face of said first leg in generally opposed relationship to said apex and with one edge surface of a leg of said equilateral triangular projection lying along the projection of a plane bisecting said apex; and (e) means disposed along the planar faces of said first and second legs for receiving and accommodating fasteners for securing said "L"-shaped connection member to individual structural members for interconnection thereof; and (f) the arrangement being such that said teeth mesh and interlock to form a stable interconnection and with the spacing of said plurality of interlocking teeth being such that said inside opening-defining and outside projection-defining surfaces of said rectangularly shaped opening and rectangularly shaped projection respectively are in mutually abutting relationship with other structural members of a first commercially common thickness dimension, and are spaced apart by a distance equal to the center-to-center spacing of said teeth when a second individual structural member of a second and larger commercially common thickness dimension is interposed between mating interlocking bracket means.

2. The interlocking shelf bracket means as defined in claim 1 being particularly characterized in that said means for accommodating fasteners include concave circular cavities for receiving nails therein.

3. The interlocking shelf bracket means as defined in claim 1 being particularly characterized in that said means for receiving and accommodating fasteners include tapered slots.

4. The interlocking shelf bracket means as defined in claim 1 being particularly characterized in that a substantially equilateral triangular projection extends from the inside surface of said rectangularly shaped opening, and a mating projection extends outwardly from said generally rectangularly shaped interlocking projection.

5. The interlocking shelf bracket means as defined in claim 1 being particularly characterized in that said shelf bracket is fabricated from molded plastic.

* * * * *